June 10, 1969        D. M. HATCH        3,449,189
METHOD FOR FABRICATING ABLATIVE AND INSULATIVE STRUCTURES
Filed April 22, 1965
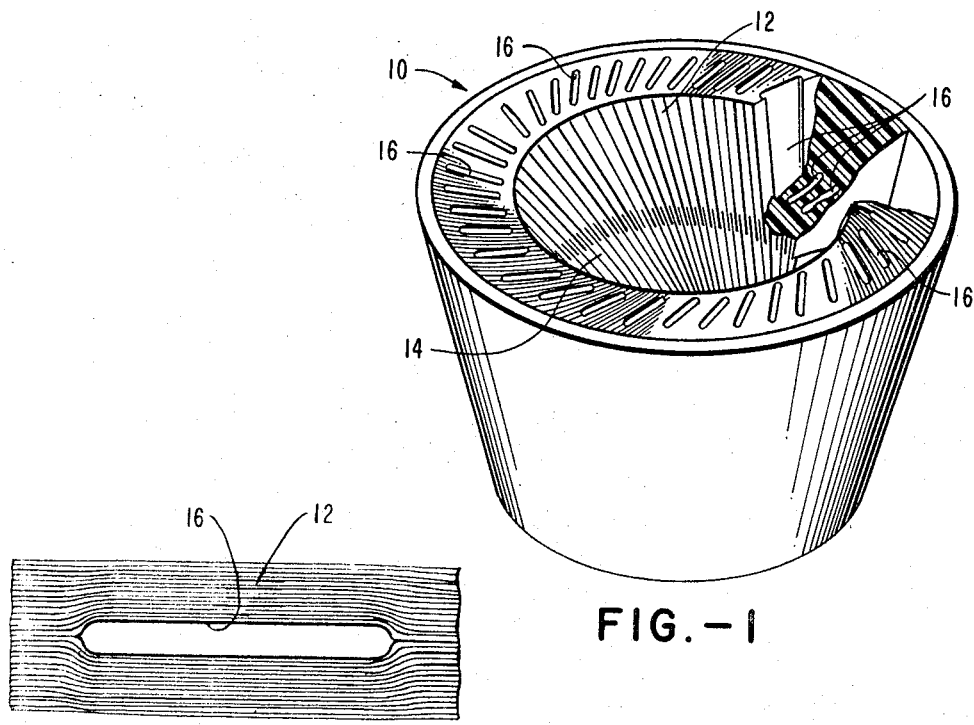
FIG.—1
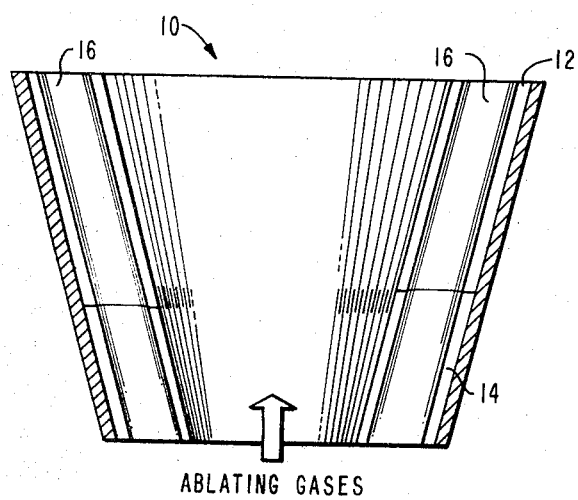
FIG.—3
FIG.—2
ABLATING GASES
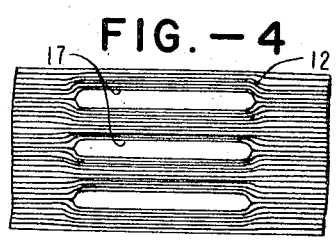
FIG.—4
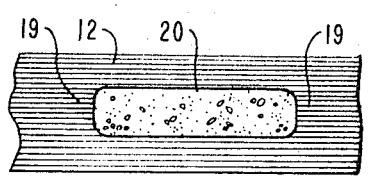
FIG.—5
INVENTOR.
DONALD M. HATCH
BY Fraser and Bogucki
ATTORNEYS

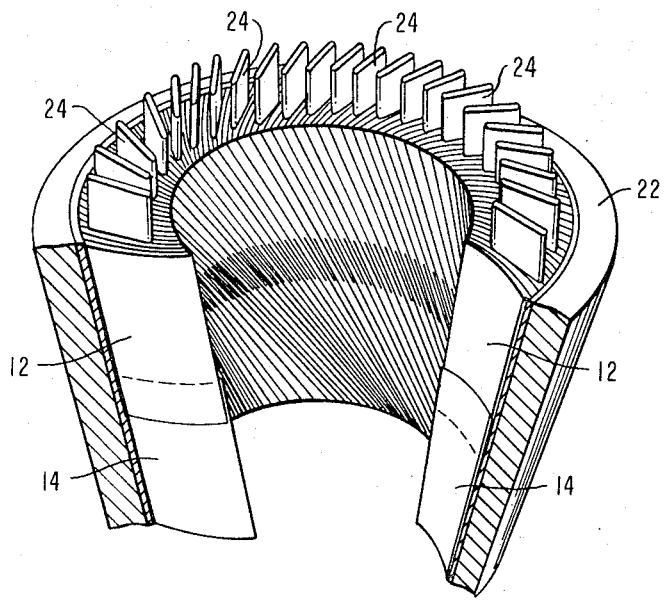
FIG.—6
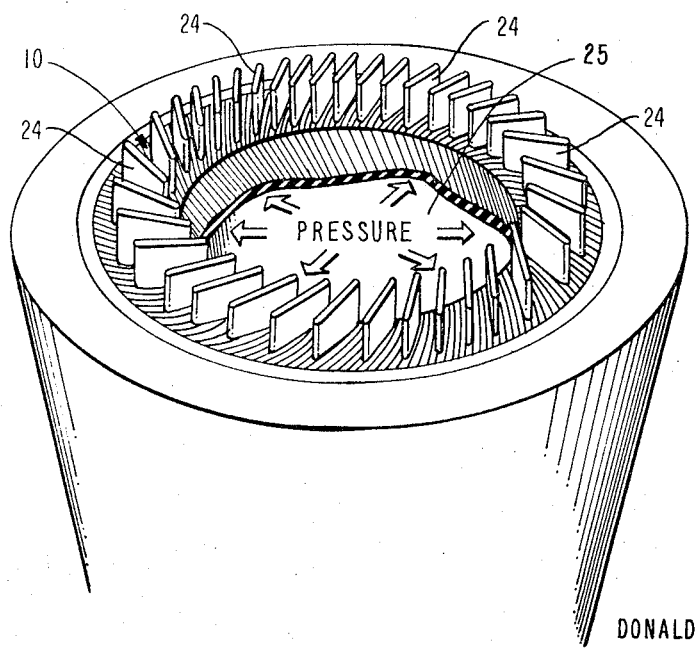
FIG.—7

June 10, 1969     D. M. HATCH     3,449,189
METHOD FOR FABRICATING ABLATIVE AND INSULATIVE STRUCTURES
Filed April 22, 1965     Sheet 3 of 3
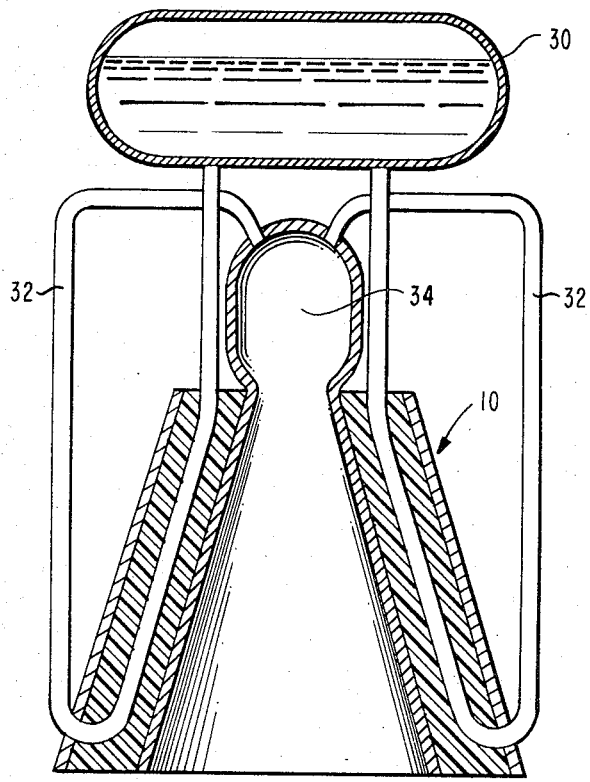
FIG.—9
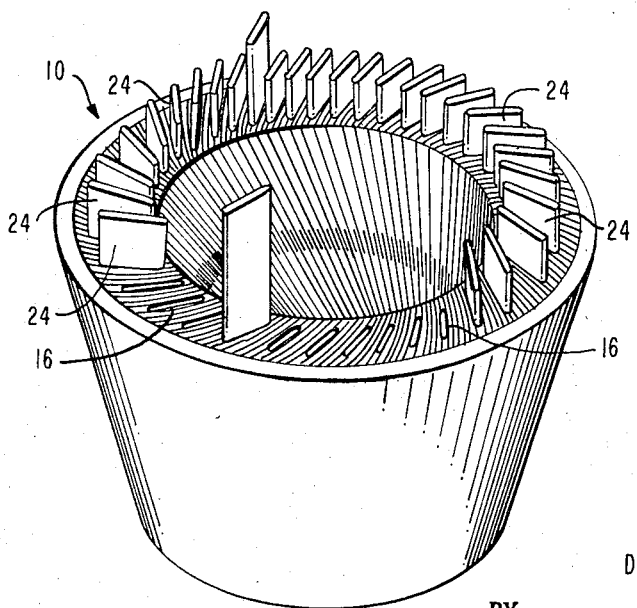
FIG.—8
INVENTOR.
DONALD M. HATCH
BY Fraser and Bogucki
ATTORNEYS United States Patent Office 3,449,189
Patented June 10, 1969

3,449,189
METHOD FOR FABRICATING ABLATIVE AND
INSULATIVE STRUCTURES
Donald M. Hatch, Harbor City, Calif., assignor to Hitco, a corporation of California
Filed Apr. 22, 1965, Ser. No. 450,076
Int. Cl. B29c 1/14
U.S. Cl. 156—222                                     6 Claims

ABSTRACT OF THE DISCLOSURE

As ablative structure in the form of a relatively thick-walled body of revolution is prepared by laying up, substantially side by side successive panels of high temperature resistant materials impregnated with a thermally curable resin within a female mold, disposing between certain panels removable aperture-defining plugs out of communication with the interior and exterior surface of the body, curing the resin and densifying the structure under radially outwardly exerted pressure and removing the plugs from the structure.

---

This invention relates to high temperature structures, and more particularly, to structures and methods for providing superior combinations of insulative, ablative and structural properties in high temperature bodies.

Advancements in high temperature technology have resulted in the development of materials and structures for withstanding severe environments for adequately long time intervals. Such structures are often required to withstand not only high temperatures, but also the eroding effects of gases moving at high velocities. Any useful system operating under these conditions must provide an adequate degree of thermal insulation, as well as protection from erosion. Thus, although certain metals and alloys are known which can withstand both high temperature and gas velocities, the heat conductivities of these materials are such that the "cold side" temperature very quickly becomes excessive.

Other expedients have therefore been adopted or experimented with, in attempts to overcome the multiple problems presented by such environments. These expedients have included the use of cooling media adjacent to or moving along the exposed surface, and the use of materials or structures which provide protection of the exterior surface. By far the most widely used technique, however, is based upon the principle of ablation. In accordance with the severity of temperature and gas velocity to be encountered, and the length of time for which protection is required, the ablative surface erodes relatively slowly and in a controlled fashion, while still presenting a high degree of resistance to the transfer of heat. Thus, as the ablative surface is progressively eroded, it must remain effective for the dual purposes of structural protection and insulation throughout the entire operating interval of the system with which it is employed. The ablative structure typically is a composite structure formed of a high temperature resin matrix reinforced by selected fiber materials. Resistance to erosion is primarily determined to a considerable extent by the composition and properties of the reinforcing fibers. The fibers often are most conveniently handled in the form of pre-impregnated fabrics or tapes, built up into the desired solid shape. The entire structure is usually densified in a hydroclave or autoclave as the resin is cured at elevated temperatures.

As increasingly stringent demands have been made on ablative structures, it has been found that superior ablative and insulative properties are achieved by selective control of the orientation of individual fibers.

Longer life and better control are achieved if the individual fibers are disposed such that they erode progressively along their length. For this purpose, the ends of at least most of the fibers are usually oriented at a substantial angle to the exposed surface. At the same time, heat conduction along the fibers is apt to be the largest contributing factor to heat conduction in the insulative structure, so that it is highly desirably that a long path exist between the exposed surface and the cold side along the fibers, even though the structure may have relatively thin walls. Another important consideration is that the orientations of the tapes or fabrics should be such as to avoid delamination as the exposed surface erodes.

It has been found that superior combinations of ablative and physical properties are derived by the formation of multi-ply composite bodies from a plurality of individual panels, each disposed at an oblique angle relative to the exposed surface, and each extending from the exposed surface to the opposite cold side surface along an extended path that forms an arc between the exposed and opposite surfaces. In this manner, the fiber orientation may be optimized and the length of the conductive path greatly increased. In addition, with this type of configuration, there are material advantages in uniformity and in versatility, inasmuch as a number of different types of material may be combined into a uniform and unified structure, to optimize the characteristics of the unit.

As more stringent demands are imposed on such structures, it becomes necessary further to improve their insulative and structural properties. An ablative body is typically in the form of a hollow surface of revolution and the exposed surface is usually eroded to given extent, generally termed the char depth. The material within the structure on the opposite side from the exposed surface forms a heat sink as well as mechanical reinforcement. It is highly desirable to enhance the heat sink characteristic without using a greater amount of material or to retain the same insulative properties while reducing the weight of the structure. It is additionally highly desirable to be able to modify the complex so as to permit particular structural variations, as for example, the handling of a cooling medium.

It is therefore an object of the present invention to provide improved high temperature structures.

A further object of the present invention is to provide improved ablative insulative structures having lower weight for given structural and insulative characteristics than has heretofore been feasible.

Yet another object of the present invention is to provide improved ablative structures which require less material than prior art structures but provide greater insulative properties and are capable of many variations in configuration.

Another object of the present invention is to provide improved composite bodies for ablative and insulative applications and having lighter weight than existing structures.

A further object of the invention is to provide improved methods for fabricating high temperature bodies.

These and other objects are achieved by structures and methods in accordance with the invention which introduce fluted or hollow interior volumes within the structure. The interior flutings are so introduced that they do not materially decrease the structural properties, while enhancing the heat barrier presented by the structure.

In accordance with one aspect of the invention, an internally fluted ablative structure is provided from a multiplicity of individual panels laid up to form a hollow surface of revolution. Each panel lies along an arcuate path between the internal and external surface of the body, and has a length between these two surfaces which comprises a substantial part of the circumference of the body. The body is solid for a given depth from the exposed surface in accordance with the needed char depths. In the central part of the body wall, however, the panels are curved or spaced by other panels so as to define the interior flutings. The flutings typically do not necessarily extend along the full length of the body. The flutings may be evacuated or filled with low density materials for specific heat transfer and strength characteristics. In any event, the presence of the flutings effectively lengthens the heat conduction path extending from the exposed surface to the cold side surface along the individual plies. Alternatively, a cooling medium may be passed within the flutings where requirements dictate or system operation is improved.

Methods in accordance with the invention readily incorporate the desired interior volumes into ablative and insulative structures without requiring special equipment or modification of the structures themselves. During lay-up of a body forming a hollow surface of revolution by the multiply technique, for example, elongated strips of non-adhesive or destructive nature may be inserted within the plies at appropriate spacings around the periphery of the body. The characteristic of this type of ablative structure is that during conventional hydroclave or autoclave densification, adjacent panels move freely relative to each other as the body compresses, until the ultimate form is reached. Thereafter, the inserts may be removed or decomposed, following densification, leaving an ablative structure with interior fluting of the kind desired.

A better understanding of the invention may be had by referring to the following description, taken in conjunction with the accompanying drawing, in which:

FIG. 1 is a perspective simplified view, partially broken away, of an ablative structure in the general form of a hollow body of revolution in accordance with the invention;

FIG. 2 is a side sectional view of the arrangement of FIG. 1;

FIG. 3 is an enlarged plan view of a fragment of the arrangement of FIG. 1, showing the disposition of panels therein;

FIG. 4 is an enlarged plan view of a fragment corresponding to FIG. 3, showing an alternative disposition of panels therein;

FIG. 5 is an enlarged plan view of a fragment corresponding to FIG. 3, showing a second alternative disposition of panels therein;

FIG. 6, 7 and 8 show successive steps in a method of constructing an ablative structure in accordance with the invention; and FIG. 9 is a simplified sectional view of an ablative and insulative system using a cooling medium in conjunction with structures in accordance with the invention.

Referring now to FIGS. 1 and 2, ablative and insulative structures in accordance with the invention are typically formed as thick walled bodies defining surfaces of revolution. For a rocket nozzle 10 as shown, for example, the exposed surface is typically the interior of a truncated cone or other body. The depth of material to be ablated or substantially modified in character constitutes the char depth, and in the rocket nozzle shown is assumed to require (together with the immediately adjacent solid part needed for backup) approximately ⅓ or ¼ the radial thickness of the nozzle 10.

In the multi-ply construction shown, the ablative body is formed of a plurality of individual panels, each having a longitudinal edge contiguous with the external surface, as well as a longitudinal edge contiguous with the internal surface, with the panels being successively overlaid in the circumferential direction. Thus each panel follows a relatively long arcuate path between the inner and outer surfaces and presents only the edge of the panel to the eroding gases.

Here, the versatility of this type of structure is used to advantage, by employing one type of panel at the larger end, and a different type of panel 14 at the smaller end. The two types of panels 12, 14 are interleaved in the intermediate region into a unitary structure. Other variations of this system are also feasible, because different panels may be interleaved through a given thickness, or through separate adjacent thicknesses.

If the panels are composed of fabric materials, the fabric weave and cut may be controlled so that the individual fibers have optimum achievable orientations for desired properties. In practice, this type of structure offers many advantages over tape wound and other ablative structures because it is readily fabricated, has a high degree of uniformity, and is capable of many modifications. The panels may be laid up rapidly within a female mold, for example, and various materials may be interleaved in regular patterns. The panels may be varied either or both longitudinally and circumferentially, to tailor strength and temperature characteristics to desired properties along the length and throughout the thickness of the nozzle 10. Because the panels are free to slide relative to each other during densification and curing, the resultant structure is free of wrinkles and undesired voids. All such advantages are retained in configurations in accordance with the invention, although it is not necessary to show the various modifications of form or material which are feasible.

According to the form of the invention shown in FIGS. 1 and 2, the nozzle 10 is completely solid to a given depth from the exposed surface, but the panels are slightly distorted through curvature to define interior flutings 16 or apertures at successive areas about the periphery of the nozzle 10. As best seen in FIG. 3, the panels 12, 14 curve slightly from the nominal arcuate path which the plane of each panel follows. Thus on opposite sides of an aperture 16, the panels 12, 14 are distorted in opposite directions, although joining to form solid segments on each of the inner and outer surfaces of the body 10.

Alternatively, as shown in FIG. 4, the distortion of individual panels may be substantially reduced by increasing the number of flutes 17, but decreasing the thickness of each flute. The total enclosed internal volume may thereby be kept substantially the same without the introduction of a possible point of weakness due to a sharp discontinuity in the notch region at which the panels providing the opposition faces of an aperture join to form a solid wall.

A different arrangement is provided to a like effect through the use of shortened filler panels 19 in the regions of the apertures, as shown by the enlarged fragmenary sectional view of FIG. 5. The shortened filler panels 19 are separated by the desired flutings extending through the multi-ply structure, but do no disrupt the normal long conductive path beween the exposed and cold side surfaces.

Another alternative expedient in accordance with the invention is also shown in FIG. 5, and comprises the use of a filler material 20, such as a low density foam, or a high density material having low heat conductivity in the aperture. Either inserted material contributes to the solidity of the structure, but if a filler is employed, it is preferred to use a low density material, partly for insulation properties but particularly because the benefits of weight reduction are substantially fully retained.

It may be observed that for a given amount of material the included apertures 16 effectively increase the thickness of the nozzle 10. There is no conductive medium in these included volumes, and the only heat conduction path is along the lengths of the panels 12, 14. Accordingly, a greater heat capacity is obtained for a given weight of material. It is found that the interior apertures are physically reinforced adequately by the solid ribs existing between the panels 12, 14. These ribs can in any event be modified in thickness and disposition to provide desired final properties.

Through the use of structures in accordance with the invention, improvements of the order of 20 percent (decrease) in the composite density of a particular unit have been achieved, utilizing identical fiber materials and resin systems. The improvement in density reduction is equivalent to like improvements in weight, or heat sink capabilities, whichever it is preferred to utilize. Nonetheless, the surface presented for erosion remains as dense and ablation resistant as a completely solid structure.

Although the specific forms shown have the configuration of hollow bodies of revolutions, it will be appreciated that the principles of the invention may also be applied to planar surfaces, or bodies other than bodies of revolution. Where a body of revolution has an extremely large radius, of course, the configuraion of an incremental area may be regarded as essentially planar. Planar members are utilized as heat shields, micrometeorite shields, and the like, and correspond directly to a flattened section of the arrangement illustrated in FIGS. 1 and 2.

As shown in the successive steps of FIGS. 6–8, the layup and processing of multi-ply structures in accordance with the invention do not require special equipment or special handling techniques. First, as best seen in FIG. 6, the panels are initially overlaid circumferentially within a female mold 22, with the individual panels being cut in a desired geometric shape, which will typically be somewhat irregular, in accordance with the thickness of the body, the degree of flair and taper in the body, and the angle desired for the panel within the body. In this figure, as in the other figures in the drawings, the representation of the panels has been simplified for clarity. It will be appreciated that many more panels are utilized than are shown. As the layup proceeds, the panels are disposed in groups. Solid plugs or inserts 24 of flattened band-like form are placed longitudinally along the panels 12 between each adjacent pair of panel groups during the layup. A release agent may conventionally be applied to the surfaces of the inserts 24. Retention means (not shown), such as adhesive strips, staples, wire brads, and the like, may be used temporarily in order to hold the panels and inserts in place. At this point, of course, the structure is not unified inasmuch as the panels 12, 14 are only loosely retained relative to each other and the inserts 24.

In the next step, as shown in FIG. 7, the body 10 is densified and cured by any conventional pressurizing and heating means while remaining within the female mold 22. A hydroclave or autoclave is conventionally used for this purpose. A pressure bag or bladder 25 is placed within the body and covering the exposed surfaces of the panels 12, 14. Hydrostatic pressure (or atmospheric if a vacuum is used) forces the bag 25 constantly outwardly toward the female mold 22 during the densification and cure step. Typically the panels 12, 14 will comprise resin impregnated fabrics of silica, glass, carbon or graphite materials. In the densification step, the excess resin is forced out, the panels 12, 14 are compressed together into a unified mass packed tightly about the inserts and the resin thus forms a hardened cured matrix for the fiber reinforcement.

After densification and curing, as shown in FIG. 8, the inserts 24 are removed to provide the fluted apertures 16 extending longitudinally along the body. The inserts 24 may, for example, be made of solid stripes of "Teflon" which, because of its extremely low coefficient of friction, does not adhere and permits ready mechanical withdrawal of the strips 24. Alternatively, any suitable chemically decomposable material may be employed.

Destructible inserts for this purpose may be formed through the use of a suitable material, such as a plaster which can withstand the heat of the densification step and retain sufficient rigidity, even though the plaster can later simply be washed out with water. It is also feasible to use soft material, such as a soft aluminum alloy. The use of a hardened rubber insert, however, is preferred because of the relatively low cost of this material, and because of the ease with which such material can be machined and removed from a formed part.

As a final step for the completion of the component itself, as partially shown in FIG. 8, the exposed surface is machined and finished to give dimensions. The remainder of the structure may be machined, overlaid with other materials, or filament windings, or inset into a mating shell as desired.

As shown in FIG. 9, the internal apertures provide integral conduits for an appropriate cooling medium. Under particularly extreme conditions, the heat capacity of a given ablative structure may be exceeded, either because of the intensity of the exposure or because of the duration of the exposure. It has accordingly been the practice, in liquid cooled rocket engine systems, to achieve a degree of cooling by piping liquid fuel past the combustion chamber and the nozzles to cool this portion of the engine while at the same time preheating the fuel for immediate combustion. The system of FIG. 9 is an example of this type of heat exchange system. Liquid fuel from the tank 30 is passed through conduits 32 and through the apertures 16 in the nozzle 10 before passage to the combustion chamber 34. This arrangement preheats the fuel while protecting the nozzle 10.

The arrangement of FIG. 9 provides merely one illustration of the use of fluted apertures for handling a cooling medium. As will be recognized by those skilled in the art, a cooling medium need not be circulated through the aperture from a fuel supply or other low temperature source, but a suitable fluid medium might be stored within the apertures, with or without external cooling by means of a heat exchanger.

While there have been described and illustrated various structures and methods in accordance with the invention, it will be appreciated that the invention is not limited thereto, but includes all modifications and variations encompassed within the scope of the appended claims.

What is claimed is:

1. A method of forming an ablative structure, said method comprising laying up a plurality of panels of thermally curable resin impregnated fabric material in substantially parallel side-by-side relation within a female mold in a direction such that adjacent panels are free to flow relative to each other, inserting aperture-defining removable plugs between adjacent panels at spaced intervals through said plurality of panels, and positioning said plugs out of communication with an interior surface defined by said plurality of panels and the opposite exterior surface defined by said plurality of panels, curing the resin and densifying the structure thus formed under radially outwardly exerted pressure, and subsequently removing said plugs from said structure, whereby a unitary structure having a plurality of spaced parallel apertures out of communication with said interior surface and said opposite exterior surface of said structure is provided.

2. A method of forming an ablative structure comprising a surface of revolution, said method comprising laying up thermally curable resin impregnated fabric panels within a female mold such that said panels are in substantially side-by-side relation, with an inner edge of each panel defining a portion of an interior surface of said structure and the opposite outer edge of each panel defining a portion of the opposite exterior surface of said structure, disposing between certain of adjacent panels at regularly spaced intervals removable aperture-defining plugs and positioning said plugs out of communication with said interior surface and said opposite exterior surface, curing the resin and densifying the structure thus formed under radially outwardly exerted pressure, and thereafter removing said plugs from said structure, whereby a unitary structure having a plurality of spaced apertures out of communication with said interior surface and said opposite exterior surface is provided.

3. A method of forming an ablative structure, said method including the steps of successively disposing a plurality of thermally curable resin impregnated fabric panels of a first material in overlapping relation in a given direction to form a first surface, successively disposing a plurality of panels of a second material on said first surface in overlapping relation in a given direction, interleaving selected panels of the second material with selected panels of the first material in a transition zone between the two materials, inserting a plurality of aperture-defining plugs at spaced intervals between certain adjacent panels of at least one of said materials and positioning said plugs out of communication with the opposite surfaces defined by the edges of the panels, curing the resin and densifying the entire structure and thereafter removing said removable plugs, whereby a unitary structure having a plurality of spaced apertures out of communication with the exposed surface of the structure is provided, said apertures imparting improved thermal insulation properties and reduced weight to said structure.

4. A method of forming an ablative structure in the form of a relatively thick-walled body of revolution, said method comprising laying up successive panels in circumferentially overlapping relation within a female mold, the panels being resin impregnated with a concentration of thermally curable resin sufficient to securely bond said panels together, inserting removable aperture-defining plugs between adjacent panels at spaced intervals about the circumference of the female mold and out of communication with an interior surface and an opposite exterior surface of said ablative structure, exerting pressure radially outwardly from the interior surface of the body of revolution and concurrently maintaining a cure temperature in the body for a time sufficient to cure the resin and set the panels in permanent fixed relation within the body while the pressure is being exerted, and thereafter removing said plugs whereby a unified structure is provided having a plurality of spaced insulating apertures out of communication with interior and exterior surfaces of said structure and out of communication with one another.

5. The method of claim 4 wherein the panels comprise high temperature resistant textile fabrics in geometrical shapes.

6. A method of forming a lightweight high strength walled ablative structure having an interior ablative surface in the form of a surface of revolution, the structure having relatively high insulating properties and minimal delamination in operation at elevated temperatures and velocities, said method including laying up successive individual panels of a first thermally curable resin-coated fabric in a female mold with one edge defining a part of the exterior surface of the structure to be formed and with the opposite edge defining a part of the interior surface of the structure to be formed, said panels being aligned in an arc such that the edge defining said exterior surface of said structure is displaced transversely with respect to the opposite edge of said panel, said panels being disposed in circumferential overlapping relation in said mold, laying successive individual panels of a second thermally curable resin-coated fabric adjacent to the first resin-coated fabric within said mold and in substantially the same direction, interleaving at least some of the panels of the second fabric with at least some of the panels of the first fabric to form a transition zone between the volume defined by the panels of the first fabric and the volume defined by the panels of the second fabric, inserting removable plugs covered with release agent between the panels at spaced intervals throughout the structure and out of communication with the exterior surface of said structure and the opposite interior surface, densifying the structure within the mold by radially outwardly exerting pressure thereon while curing the resin system by simultaneously elevating the temperature of the fabric and resin, thereby permanently positioning said panels to form an integral ablative structure, and thereafter removing said removable plugs, whereby a plurality of spaced parallel apertures out of communication with each other and with the interior surface and opposite exterior surface of said structure are provided in said structure, said apertures providing improved thermal insulation for said structure while decreasing the weight thereof.

References Cited

UNITED STATES PATENTS

| 2,009,265 | 7/1935 | Hirschfield | 156—222 X |
| 2,576,864 | 11/1951 | Valente | 156—222 X |
| 2,768,920 | 10/1956 | Stout | 138—141 X |
| 3,081,705 | 3/1963 | Warnken | 102—92.5 |
| 3,135,297 | 6/1964 | Nordberg et al. | 138—144 |
| 3,196,061 | 7/1965 | Paulson et al. | 156—296 |

EARL M. BERGERT, *Primary Examiner.*

MARTIN L. KATZ, *Assistant Examiner.*

U.S. Cl. X.R.

29—157; 60—271; 138—141; 156—163; 264—258